United States Patent [19]

Nelson et al.

[11] Patent Number: 5,335,609
[45] Date of Patent: Aug. 9, 1994

[54] THERMAL AND CHEMICAL REMEDIATION OF MIXED WASTE

[75] Inventors: Paul A. Nelson, Wheaton; William M. Swift, Downers Grove, both of Ill.

[73] Assignee: University of Chicago, Chicago, Ill.

[21] Appl. No.: 55,360

[22] Filed: Apr. 29, 1993

[51] Int. Cl.$^5$ ............................................. F23G 5/00
[52] U.S. Cl. .................................. 110/346; 110/204; 110/245; 110/345; 422/139
[58] Field of Search ............... 110/345, 346, 245, 204, 110/246; 422/139

[56] References Cited

U.S. PATENT DOCUMENTS

| | | |
|---|---|---|
| 3,654,705 | 4/1972 | Smith et al. |
| 3,932,118 | 1/1976 | Eggers, III et al. |
| 4,040,865 | 8/1977 | Eggers, III et al. |
| 4,153,411 | 5/1979 | Isheim . |
| 4,159,682 | 7/1979 | Fitch et al. |
| 4,180,455 | 12/1979 | Taciuk . |
| 4,197,086 | 7/1980 | Daman . |
| 4,215,637 | 8/1980 | Lombana . |
| 4,232,614 | 11/1980 | Fitch et al. |
| 4,248,164 | 2/1981 | Isheim . |
| 4,275,668 | 6/1981 | Daman . |
| 4,280,879 | 7/1981 | Taciuk . |
| 4,285,773 | 8/1981 | Taciuk . |
| 4,306,961 | 12/1981 | Taciuk . |
| 4,355,601 | 10/1982 | Hattiangadi ............... 110/204 X |
| 5,044,287 | 9/1991 | Furukawa et al. ............ 110/344 |
| 5,179,903 | 1/1993 | Abboud . |

OTHER PUBLICATIONS

Consider Fluid-Bed Incineration for Hazardous Waste Destruction, Jun., 1992, Chemical Engineering Progress, John F. Mullen, Dorr-Oliver.

A System for Destroying Mixed and Hazardous Wastes with No Gas or Liquid Effluents, Lawrence Livermore National Laboratory, D. W. Camp and R. S. Upadhye, Apr., 1992.

Liquefaction and Storage of Thermal Treatment Off-Gases, D. M. Stull and J. O. Golden, EG&G Rocky Flats, U.S. Dept. of Energy, Sep. 8, 1992.

*Primary Examiner*—Edward G. Favors
*Attorney, Agent, or Firm*—Emrich & Dithmar

[57] ABSTRACT

A process and system for treating organic waste materials without venting gaseous emissions to the atmosphere. A fluidized bed including lime particles is operated at a temperature of at least 500° C. by blowing gas having 20%/70% oxygen upwardly through the bed particles at a rate sufficient to fluidize same. A toxic organic waste material is fed into the fluidized bed where the organic waste material reacts with the lime forming $CaCO_3$. The off gases are filtered and cooled to condense water which is separated. A portion of the calcium carbonate formed during operation of the fluidized bed is replaced with lime particles. The off gases from the fluidized bed after drying are recirculated until the toxic organic waste material in the bed is destroyed.

20 Claims, 3 Drawing Sheets

THERMAL AND CHEMICAL REMEDIATION OF MIXED WASTE

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

When operated properly, incinerators can achieve high efficiency in destroying hazardous organic materials in treating both hazardous wastes and mixed wastes. However, problems arise during improper operations or upset conditions, when dioxanes, furans, and other toxic materials may be released at dangerous levels. By means of careful design and operation, which are regulated by the Environmental Protection Agency, and various state and local agencies, dangerous emission levels can be avoided.

Fluid bed incineration for hazardous organic waste is an old concept and has been practiced for years by several companies, one of which being the Doff-Oliver Company. In the June 1992 edition of "Chemical Engineering Progress", John F. Mullin of the Dorr-Oliver Company reviewed the waste incinerator designs used to treat hazardous waste over the past fifteen years. Examples of the Dorr-Oliver technology are included in the Fitch et al. U.S. Pat. No. 4,159,682 issued Jul. 3, 1979 showing separate dryer and incinerator fluid beds wherein the dryer off gases are handled separately from the incinerator off gases and hot bed material from the incinerator is used to heat the moist feed material to the dryer. However, the Fitch et al. '682 patent vents incinerator off gases to the atmosphere. Another Dorr-Oliver patent is the Fitch et al. U.S. Pat. No. 4,232,614 issued Nov. 11, 1980, which also teaches separate air dryer and incinerator mechanisms, both of which have off gas streams which are treated separately but which eventually exit the system to the atmosphere.

Another company that has been active in the incineration of hazardous waste material was the Envirotech Corporation of Menlo Park, Calif., later bought by the Lurgi Company However, in the 70's and early 80's, the Envirotech Company operated a number of systems in an attempt to treat sewage sludge and industrial waste. Representative systems include rotary kiln systems and multiple hearth systems which were used to classify and dry sludge and thereafter incinerate same, for instance see the Isheim U.S. Pat. No. 4,153,411, the Isheim U.S. Pat. No. 4,248,164, the Lombana U.S. Pat. No. 4,215,637. There are other patents issued to Envirotech which are also pertinent; however, none of these patents relate to systems in which no vapor emissions exit to the atmosphere.

Briefly, other companies through the years, have used fluidized bed systems which treat hazardous organic compounds inherent in the operation of the system. For instance, the Foster-Wheeler Energy Corporation developed significant technology relating to the fluidized bed treatment of coal as for instance in the Daman U.S. Pat. No. 4,275,668 issued Jun. 30, 1981, the Taylor U.S. Pat. No. 4,197,086 issued Apr. 8, 1980 and other Foster-Wheeler patents of this general time frame; however, none of the Foster-Wheeler systems and processes to the knowledge of the applicants included systems which are unvented to the atmosphere. Combustion Power Company in Palo Alto, Calif. investigated fluidized bed separation and incineration, see the Smith et al. U.S. Pat. No. 3,654,705 issued Apr. 11, 1972. A large waste incinerator was operated in Palo Alto in the 1970's and this may have been a precursor to such system. Other representative technologies in the hazardous waste disposal business include rotary kilns useful for incineration and such processes were routinely practiced throughout the United States in the 70's and 80's for incinerating waste including hazardous waste of both solid and liquid, but all of these incineration technologies involve venting off gases to the atmosphere.

Finally, there is a rotary kiln process which has been successfully used to remediate PCBs at Waukegan Harbor, Ill. and at Wide Beach, N.Y., which produces a reduced amount of off gases from the remediation, represented by the Taciuk U.S. Pat. Nos. 4,180,455, 4,280,879, 4,285,773 and 4,306,961. However, the Taciuk patents still produces significant quantities of vapor which has to be treated by down stream equipment. Various technologies presently exist which combine incineration with chemical reaction in treating hazardous materials and representative examples of these are the Eggers, III U.S. Pat. No. 3,932,118 issued Jan. 13, 1976 and U.S. Pat. No. 4,040,865 issued Aug. 9, 1977, both of which relate to the pyrolysis of PCB material combined with incineration in a fluidized bed wherein $CaCO_3$ particles are used to react with chlorine produced during the destruction of PCB to produce $CaCl_2$. Nevertheless, none of the technologies recited above, although representative of the presently known treatment of hazardous waste materials by fluidized beds, multiple hearth furnaces and rotary kilns, illustrate a process in which no off gases from the treatment of the hazardous waste material per se are emitted to the atmosphere.

The above quoted technologies while effective to remediate hazardous waste fall short because satisfying the local public on all aspects concerning the operations of an incinerator is often more difficult than demonstrating to the scientific community and the appropriate agencies that the emission standards can be met. The public's main concern with incinerators is the risk of toxic organic emissions or radioactive emissions. The public perceives nearby incinerators to be a risk to health imposed by the government or industry, and also a factor tending to lower property values. As a result, the siting of incinerators has become very contentious and expensive. A process that does not produce emissions, such as the inventive process described herein, may meet with greater public acceptance.

Work has been done previously to reduce or eliminate the emissions from incinerators. Stull and Golden at EG&G Rocky Flats have evaluated off-gas capture systems from a fluidized-bed oxidation unit. In the two systems evaluated, 85% of the off-gas from the fluidized bed oxidizer would be recycled with oxygen make-up, and the remaining 15% would be compressed to liquid $CO_2$, stored in tanks, sampled, and ultimately released. One process requires compression to 75 bar (1100 psia) at 16° C. (60° F.), and the other requires compression to 24 bar (350 psia) at −26° C. (−15° F.). Another approach was taken by Camp and Upadhye of Lawrence Livermore National Laboratory. In their proposed process, the mixed waste could be destroyed in any one of many types of incinerators with an oxidant of oxygen and recycled $CO_2$. The off-gases would be directly quenched with water in a venturi scrubber. Acid gases would be removed by reacting with sodium hydroxide in a packed tower, and $CO_2$ would be removed in a second packed tower by contacting with calcium hydroxide. The remaining oxygen, $CO_2$, water vapor, and trace gases would be recycled to the waste destructor with makeup oxygen. The solid materials in the slurries exiting the packed towers would be consolidated to moist solids, which could be buried. The Livermore process would produce a large amount of solids for burial, which was viewed by them as a disadvantage.

Still another approach is set forth in the recently issued U.S. Pat. No. 5,179,903 issued Jan. 19, 1993, to Abboud et al., which uses enriched air and high incineration temperature along with several scrubbers to treat effluents from the system.

The inventive process is designed for treating mixed wastes that have accumulated at Argonne National Laboratory (ANL) over several decades. The type of mixed waste stored an ANL that has the largest volume is scintillating counting waste, which is stored in 200 drums of 55-gal. capacity. Each drum holds 2000–4000 vials of toluene-based scintillation fluid containing radioactive materials from a wide range of projects. The vials are packed in vermiculite, which also must be treated as a mixed waste. With the proper head-end step to separate the organic liquid from the balance of the materials, this waste inventory could be treated by the inventive process hereinafter described. Also, the biological mixed waste at ANL could be treated by the proposed process, which would destroy the biological materials and separate the inorganic low-level radioactive waste for burial.

The treatment of these wastes at the ANL site is a difficult problem because ANL is located near suburban residences. Installation of a conventional incinerator would be out of the question. The inventive process and system does not release gases from the equipment during the thermal destruction of organic materials. The only products from the inventive system and process are liquid water and calcium carbonate. In one version of the invention, treating the limited quantities of ANL waste, the calcium carbonate and water produced would be mixed with cement-making materials to produce cement. This solid material would be the only product from the process.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE EMBODIMENT

Figure 1:
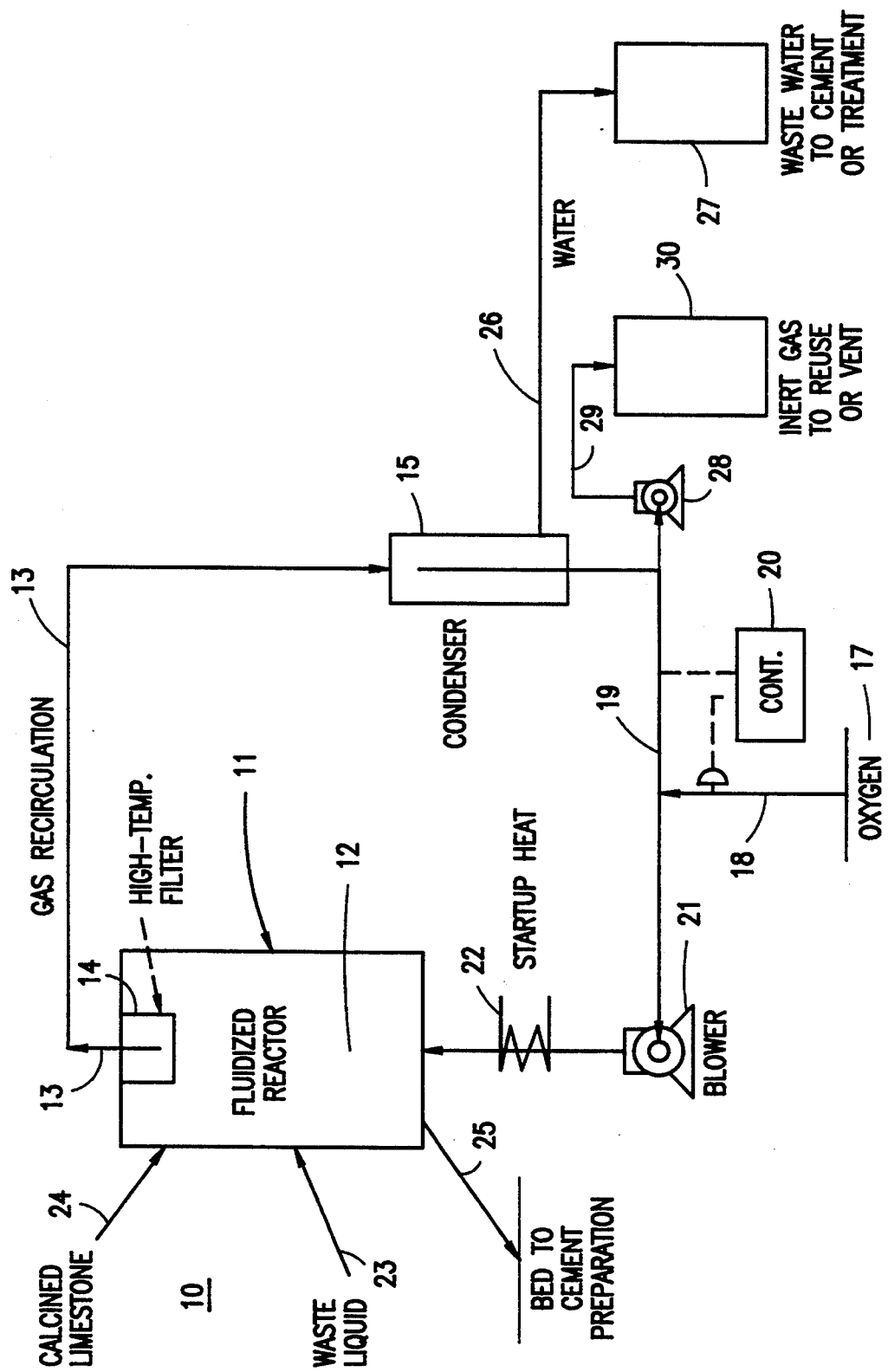
FIG. 1 is a schematic flow diagram of an embodiment of the invention.

The key feature of the inventive system and process for treating mixed and hazardous wastes is that it does not release gases during the thermal treatment operation. Referring to FIG. 1, the system 10 in which this process is practiced has a fluidized-bed reactor 11 containing a bed 12 of calcined limestone (CaO), which reacts with gases given off during oxidation of organic waste materials. Gases that will react with CaO include $CO_2$, $SO_2$, HCl, HBr, and other acid gases. Water vapor formed during the oxidation process is carried off with the fluidizing gas via line 13 through a ceramic candle filter 14 and removed in a condenser 15. One such filter 14 is suitable for the system 10 is a vacuum formed ceramic filter available from Industrial Filter and Pump Mfg. Co., made and operated as set forth in U.S. Pat. Nos. 4,865,629 and 4,909,813. Oxygen is added from a source 17 thereof via a line 18 to the remaining gas (mainly nitrogen), which is recirculated to the reactor 11 from a line 19 leaving the condenser 15. A controller 20 senses the $O_2$ content in the line and controls the amount of oxygen added. Relatively pure oxygen, such as welders oxygen, is added through line 18, and the system 10 is preferably maintained with an oxygen concentration of between 20 and 70 volume percent. A blower 21 forces the recirculated dried off gases from the condenser 15 and the make-up oxygen from source 17 to the reactor 11 to maintain the fluidized bed 12 established therein.

Electric coils 22 or any suitable heating mechanism is disposed between the blower 21 and the reactor 11 to control the temperature of the bed material at start-up. After start-up, the temperature of the bed is controlled by controlling the waste feed rate and by boiler tubing (not shown) emersed in the bed, which removes heat by generating steam. A waste feed 23, a lime or calcined limestone inlet 24 and a spent bed or ash outlet 25 are provided, all such fixtures being well known in the fluidized bed art. From the condenser 15 water is transferred via a line 26 to a collector or to treatment such as to an activated carbon bed 27. The activated carbon from the bed 27 when loaded can be introduced into the bed 12 for incineration to ash. Nitrogen is bled from line 19 by a pump 28 and sent via a line 29 to a container 30 therefor.

Thus, for most organic waste materials, there is no net production of gas by the reactions occurring within the equipment. A small amount of nitrogen might need to be collected as a result of (a) nitrogen impurity contained in the oxygen feed, (b) leakage of gas into the equipment through flanges, or (c) nitrogen released during the destruction of some organic compounds such as amines. Moreover, the nitrogen thus collected can be used to clean the ceramic candle filters by blow back mechanism, not shown. The excess gas, mainly nitrogen, is released after treatment and analysis.

Figure 2:
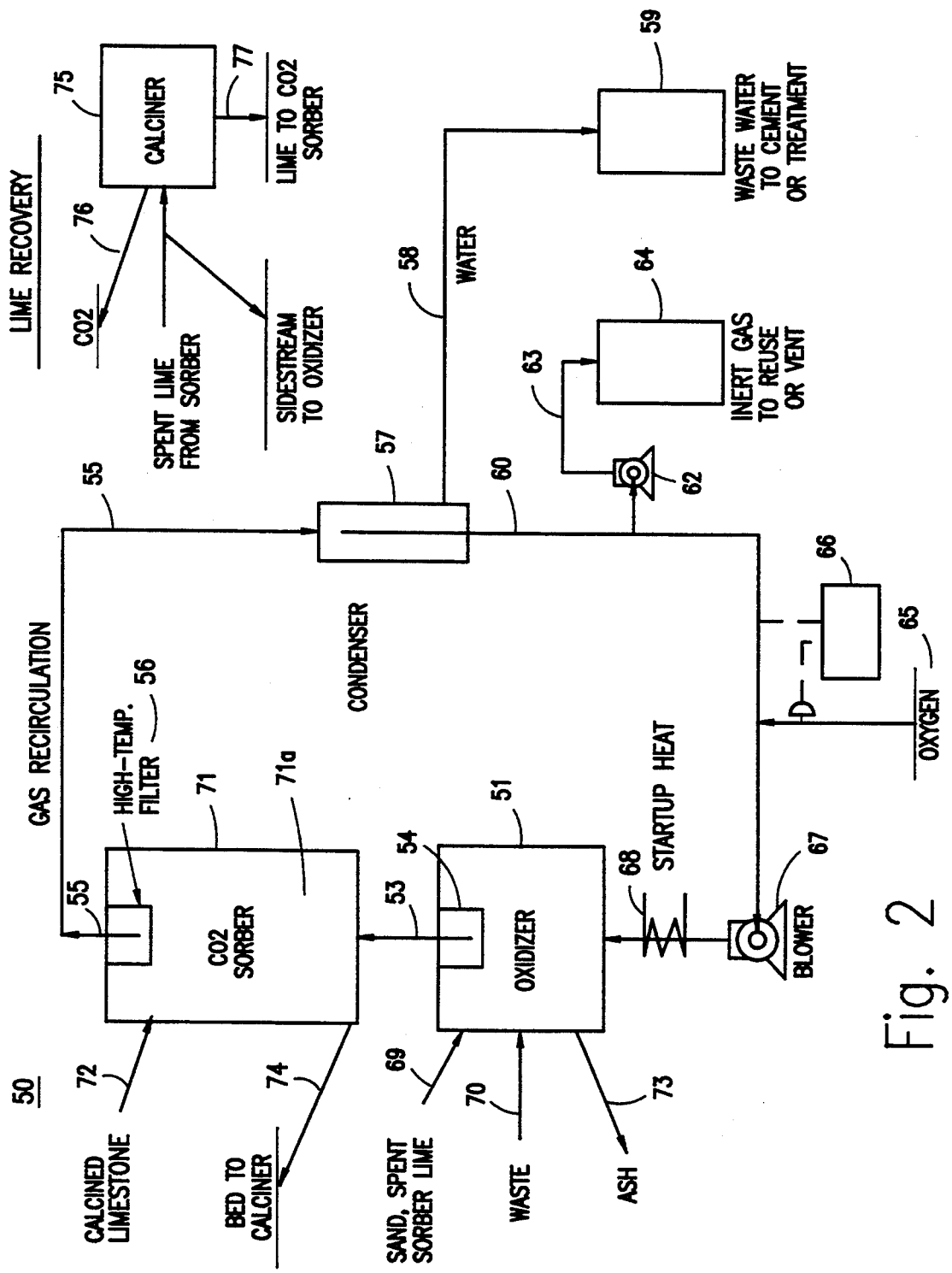
FIG. 2 is a schematic flow diagram of another embodiment of the invention.

Referring to FIG. 2, the most flexible arrangement is shown in system 50 and involves separating the processor into two separate units: an oxidizer 51 and a carbon dioxide sorber 71. The oxidizer 51 can be operated at high temperatures (600°–900° C.) to ensure complete oxidation, whereas the sorber 71 can be operated at a lower temperature (500° C.) appropriate for $CO_2$ sorption or in the range of from about 500° C. to about 750°

C., with the range of about 500° C. to about 700° C. also being satisfactory. As is known by equilibrium data, $CaCO_3$ is stable at the operating condition in the sorber, but $Ca(OH)_2$ is not. In this process, the oxidizer 51 could be (a) a fluidized bed with a mixture of sand and lime for bed material, (b) a slagging combustor, or (c) various conventional incinerators such as a rotary kiln.

The oxidizer 51 as previously indicated, may be of any type, but the off gas from the oxidizer 51 will leave through a line 53 after passing through a filter 54 which may be of the same type previously disclosed, that is a ceramic candle filter. The off gases from the oxidizer 51 flow into the sorber 71 which is provided with calcined limestone through an inlet 72. Gases from the sorber 71 leave via a line 55 after passing through a high temperature filter 56 which also may be a ceramic candle filter. The front line 55 leads to a condenser 57 which is operated at a reduced temperature, such as in the range of 40° and 80° C. in order to condense a portion of the water in the off gas from the sorber. It will be understood that the condenser 57 like the condenser 15 may be operated at any temperature below the condensation temperature, the precise temperature being one of choice and depending on the economies of system. Condensed water is removed from the condenser through line 58 to a waste water treatment or storage facility 59 which may be an activated carbon bin. Similar to the system 10 when the carbon in the bed 59 is full of absorbed materials, it may be dumped into the oxidizer 51 and be converted to ash resulting in no additional material to be treated. Dried off gases flow out of the condenser 57 in the line 60 where nitrogen is bled off via a pump 62 and transported by a line 63 to a storage container 64 therefor. The nitrogen may be stored under pressure and used along with blow back mechanism (not shown) to clean the filters 54 and 56.

Oxygen from a source 65 thereof may be added to the dried gas in the line 60 by a controller 66 which senses the oxygen concentration in the dried off gases leaving the condenser 57 and supplies oxygen such that the total oxygen concentration in the gas flowing to the oxidizer is in the range of between about 20 volume and 70 volume percent. The oxygen source 65 is preferably relatively pure oxygen such as welders oxygen which is greater than 99.5% pure. A blower 67 is interposed in the line 60 so as to force the dried off gases into the oxidizer at sufficient velocity, these velocities depending on the type of oxidizer used. If the oxidizer is a fluidized bed, obviously then the velocity of the gas will have to be sufficient to fluidize the particulate material inside the oxidizer 51. An electrical heating mechanism 68 is interposed on the line between the blower 67 and the oxidizer 51 in order to add heat to the system 50 at system start-up, because of the unusally high oxygen content of the system 50, additional heat is usually not required even if the waste material being incinerated has a low heating value.

The oxidizer 51 is provided with an inlet 69 for the spent sand and sorber line from the fluidized bed sorber 71 and waste inlet 70 for the introduction of the organic waste material to be burned. Like the fluidized bed reactor 11, the oxidizer is provided with an ash outlet 73. The fluidized bed sorber 71 is provided with an outlet 74 through which calcium carbonate which is formed during the intimate mixing of the off gas from the oxidizer with the calcine limestone in the sorber 71 is transmitted to a holding tank not shown, and from there to a calciner 75 for regeneration or to some other treatment center for disposal. If the calcium carbonate formed in the sorber is transmitted to a calciner, it is preferred that the calciner be operated at a temperature of about 950° C. which is a sufficient temperature to convert the calcium carbonate into $CO_2$ which exits the calciner through a line 76 and lime which exits the calciner 75 through a line 77 and is returned to the sorber 71 through the inlet 72. As indicated in FIG. 2, the infeed to the calciner comes from the calcium carbonate produced in the sorber 71 and a portion thereof can be sent to the oxidizer to be converted to ash so as to permit fresh lime or calcined limestone to be added to the system as required and as desirable.

In all cases, the gas from the sorber 71 is cooled to condense the water and recirculated to the oxidizer 51 with sufficient oxygen to support combustion. Lime is continuously fed to the sorber bed 71a through line 72 and continuously withdrawn through an overflow pipe (not shown). The pressure at the outlet of FIG. 1 circulating blower will be controlled at slightly less than atmospheric pressure to assure that any leaks in the system do not result in the escape of hazardous material.

If all of the reaction products are converted to cement, as intended for the ANL wastes, the total volume of the waste material might be somewhat larger than the initial organic waste volume because of the conversion of the carbon in the organic material to $CaCO_3$. This moderate increase in volume is not important in treating the ANL wastes because the total waste volume is not large and more serious problems than the waste volume are solved by the new processing scheme. This approach may also be practical for treatment of certain mixed and hazardous wastes found at other sites.

For medical wastes and other organic wastes generated at moderate rates on a site, it may be inappropriate to convert the products of the inventive process to cement. The spent lime could be analyzed to demonstrate virtual complete destruction of the organic matter and then trucked to a cement manufacturer (which may also be the supplier of the lime) for inclusion in the products of that manufacturer.

Alternatively, the volume of the products from the inventive process and of the lime supplied as reactant may be greatly reduced yet retain the main features of the process. To reduce these volumes, spent lime (mainly calcium carbonate) would be calcined in a separate unit to decompose the $CaCO_3$, recover the lime, and release carbon dioxide (upper right-hand corner of FIG. 2). The most energy-efficient form of this process would be to transfer the hot bed material 71a from the sorber 71 to the calciner 75 without cooling. To facilitate the reuse of the spent lime 69 leaving the sorber 71, it would be advantageous to add lime to the oxidizer 51 if acid gases such as $SO_2$, HCl, or HBr are being produced. This will result in the retention of sulfur and the halogens in the oxidizer ash 73. The source of the lime for the oxidizer 51 would be a small side stream 74 taken from the spent lime in the sorber 71. Thus, the only solid waste stream from the process would be the ash 73 from the oxidizer 51. The volume of ash per unit mass of waste destroyed would be about the same as for a standard fluidized-bed incinerator to which limestone is added to retain the acid-gas anions with the ash.

The division of the (a) destruction of the organic material and (b) decomposition of the calcium carbonate into separate steps carried out in different equipment greatly reduces the likelihood of the release of toxic materials from that associated with standard incinerators. Only gases enter the sorber 71, and these are almost entirely free of the hazardous organics fed to the oxidizer 51. Only a small fraction of the organic material that escapes the oxidizer 51 will be retained on the hot spent lime 74 released from the sorber 71. Most of the gas, including unreacted organics, will pass through the sorber 71 and be recirculated to the oxidizer 51. To minimize the amount of organic material released from the calciner 75, it must be indirectly heated and thus involve no air or sweep gas addition. However, it may be practical to add a small stream of gas from the inert gas collection tank 64 (which may be treated and sampled if desired) to dispose of the small amount of nitrogen entering the process, primarily as an impurity with the oxygen supply. Under these conditions of restricted gas addition, no gas is released from the calciner 75 if the temperature inadvertently drops below the minimum calcining temperatures of 800°–900° C. This approach results in long retention times at high temperatures for destroying the tiny fraction of organic gases which may be clinging to the spent lime. The off-gas 76 from the calciner 75 as operated above, would be more than 90% carbon dioxide with small amounts of oxygen and nitrogen, even with the addition of gas from the inert gas collection tank as proposed above. Its volume per unit of waste destroyed would be about 10% of that from a conventional incinerator. The off-gas treatment system required for this carbon dioxide stream 76 would consist of cooling and filtering equipment, and should be comparatively inexpensive.

If the waste to be treated contains hazardous metals or radioactive solids, it may be appropriate to vitrify the ash 73 from the oxidizer 51. Alternatively, the oxidizer 51 may be operated at an enriched oxygen level to produce a glassy slag directly. Operating at high oxygen levels is easily done in the inventive process because the oxidant 65 added to the process is pure oxygen.

Figure 3:
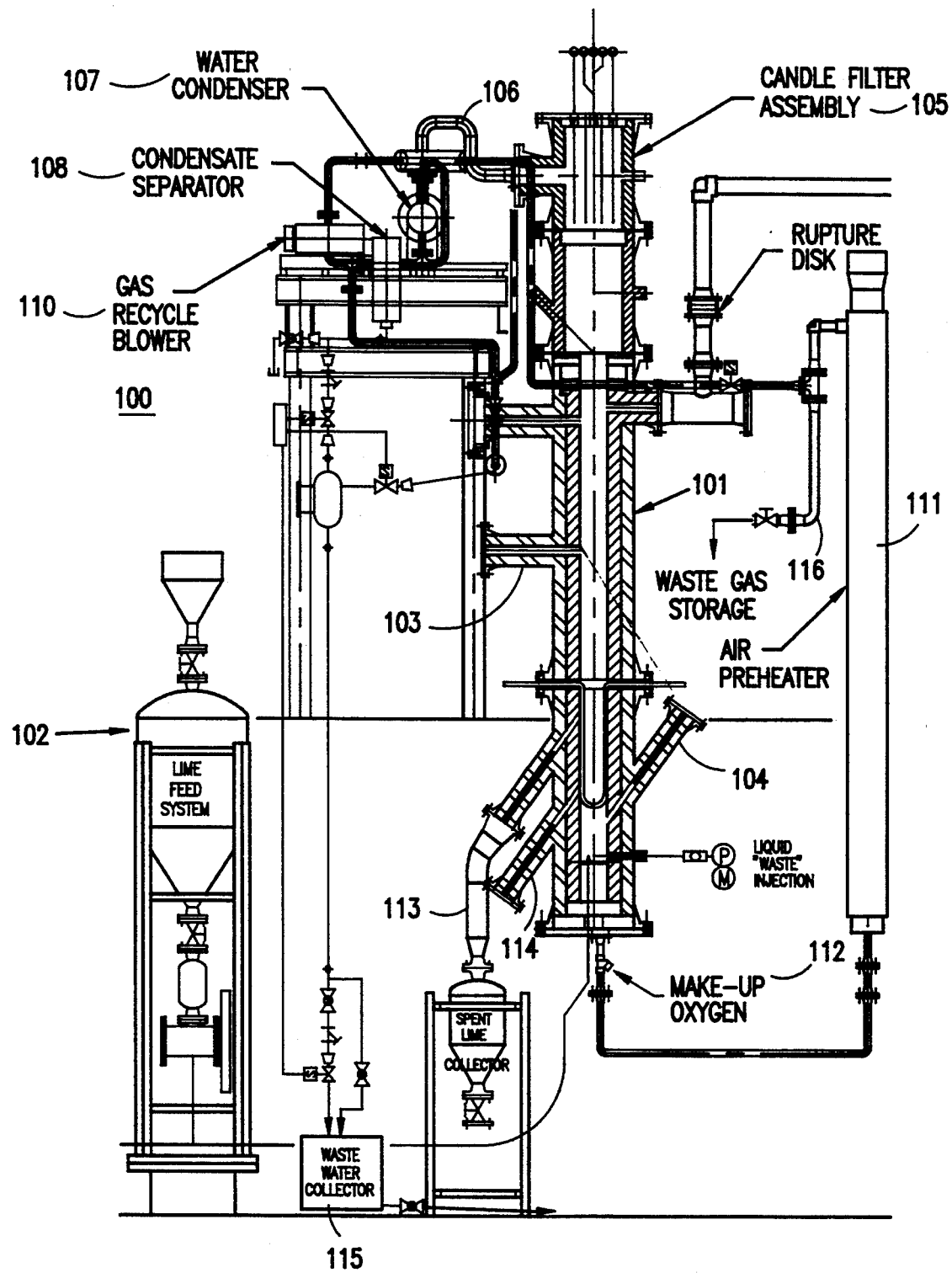
FIG. 3 is a more detailed view of the embodiment of FIG. 1.

An experimental program is underway at ANL further to develop the inventive system and process. The experiments will be carried out with a single processing unit 100, as shown in FIG. 3. The main processing unit for these studies is a fluidized-bed reactor 101 used previously for studying fluidized-bed combustion of coal. This fluidized-bed reactor has an internal diameter of 15.2 cm (6-in.) and in the previous projects was equipped for continuous feed 102 of limestone (for removal of sulfur) and continuous feed of powdered coal through inlet 103 or inlet 104, now adapted for mixed waste, solids or slurries through inlet 103 and liquids through 104.

Above the fluidized bed reactor 101 is a ceramic candle filter assembly 105 which leads via a line 106 to a water condenser 107 into a condensate separator 108. A gas recycle blower 110 will recirculate the gases through the system, there also being provided a preheater 111, which may be either electric or of another type but in any event, constructed and arranged so as not to add additional gases to the system. Make-up oxygen enters the system through an inlet 112 and is obtained from a source of relatively pure oxygen as before described. The sensors and controllers previously described with respect to FIGS. 1 and 2 will be included in this system but are not here included for brevity. The spent lime exits the fluidized reactor through an outlet 113 and may be recirculated, if necessary, to a calciner not shown and ash exits the system from an outlet 114 and may be treated as previously described. The waste water collector 115 may be used as previously described with respect to the systems of FIGS. 1 and 2 and may be sent off-site for treatment or for use in converting the waste to cement as previously described.

There is also provided a waste gas outlet conduit 116 which can be connected to a storage facility, not shown. Although the system or processing unit 100 illustrated in FIG. 3 was previously used for processing coal, it is clear that the system with some modifications can easily be used to conduct the necessary test to verify the parameters of the subject invention.

In the initial experiments on waste burning, the unit 110 will be operated with once-through gas flow and with toluene fed as a model waste compound. The bed temperature will be raised to the ignition temperature by preheating the fluidizing/combustion air stream. Once the bed is at the ignition temperature, toluene will be injected into the fluidized bed, and the experimental conditions of bed temperature and the rates of toluene and lime feed will be established. The toluene and lime will be fed to the processor continuously, and bed material will continuously overflow into a closed collection vessel. Bed temperature will be maintained by controlling the toluene feed rate and by employing an in-bed heat exchanger. The planned range of test conditions is summarized in Table I.

TABLE I

| Planned Test Conditions | |
|---|---|
| Parameter | Value |
| Liquid feed | Toluene |
| Liquid feed rate, kg/h | 0.10–0.36 |
| Lime (CaO) feed rate, kg/h | 1.5–2.3 |
| CaO/C mole feed ratio | 1.1–1.5 |
| System pressure, bar | 1.0 |
| Bed temperature, °C. | 600–700 |
| Fluidizing velocity, m/s | 0.76–0.91 |

The objective of these initial tests will be to measure and verify basic process performance parameters, such as the efficiency of toluene destruction in a single pass through the fluidized bed, the extent of the conversation of CaO to $CaCO_3$ as a function of the toluene-to-lime feed ratio, and the $CO_2$ concentration in the off gas. It will also be important to verify in these early tests that the reactive lime collected in the bed overflow is not contaminated by organic material.

Modifications to the facility have been designed and equipment procurements initiated to convert the existing fluidized-bed reactor 101 to a reactor of the type shown in system 10 with gas recirculation. A key component in the modified facility will be a candle filter assembly 105 for filtering the dust from the combustion gases and returning the solids to the fluidized bed in reactor 101. Other components include a water condenser 107 and condensate separator 108 to remove water from the gas stream, a gas recycle blower 110, and oxygen addition equipment 112, all as previously described.

The present reactor system 100 shows a slight tendency for the pressure to rise as a result of nitrogen contained as an impurity in the oxygen supplied and in air leaking into the equipment through flanges. To control the pressure at the outlet of the circulating blower to slightly below atmospheric pressure, gas will be withdrawn through line 116 by a compressor and stored at elevated pressure in a holding tank. This relatively small amount of gas may be analyzed and, if necessary, treated prior to release to the environment.

When the modifications have been completed, experiments will proceed using toluene and carbon tetrachloride as model compounds to demonstrate the destruction of organic materials without release of gases.

To aid in assessing the practicality of the proposed process, a calculation was made for the system 10. The compositions and the content of the inlet and outlet gas streams and the inlet and outlet bed material streams were calculated. The calculation of the bed densities and volumes is based on our experience in using lime in the fluidized-bed reactor for coal-burning experiments. In those experiments, it was found that the lime particles obtained by calcining limestone have a calcium density of 0.024 g-mol/cm$^3$. The particles retain their size throughout the process while changing composition and density.

Some of the key parameters are shown in Table II. These sets of calculations were made for a liquid feed mixture of toluene-20 wt. % carbon tetrachloride. Both of these constituents of the feed mixture are contained in Argonne's mixed waste inventory, and calculations were made to determine how the process would handle chlorinated hydrocarbons, a common type of hazardous and mixed-waste constituent. The first two columns of values in Table II are for the experimental reactor, which has an inside diameter of 15.2 cm (6 in.). The results shown in the first column are for a feed rate just high enough to maintain the operating temperature of the reactor without cooling the bed. The calculations in the second column are for the maximum feed rate, which was taken to be that which required an oxygen concentration of 70% for the inlet fluidizing gas, which nearly coincides with the rate calculated for the maximum practical amount of cooling tubing within the bed of the experimental reactor. The experimental reactor has a bed depth of only 91 cm (3 ft.), Calculations have been made for a large-scale reactor in the right-hand column of Table II. In scaling up the reactor, the program calculates the height of the expanded fluidized bed to be proportional to the 0.4 power of the diameter. For this reactor of 5 m-diameter, the height is 3.7 m. This configuration results in an outlet gas pressure of only 0.612 bar, indicating that the bed depth is near the practical limit. This deep bed results in a long retention time for the bed material, 68.5 minutes, which should facilitate achieving the assumed extent of lime reaction of 70%. From calculations, it is apparent that the unvented processor is better adapted to processing large throughputs of chlorinated hydrocarbons than fuel-like materials such as toluene. The chlorinated hydrocarbons not only produce less heat but also require less oxygen.

A problem in treating chlorinated hydrocarbons is the formation of calcium chloride, which may result in a tendency to particle agglomeration. Two solutions to this problem are proposed. One is to design a separate oxidizer 51 and sorber 71, as shown in FIG. 2. The other is to blend the chlorinated hydrocarbon with other hydrocarbons to reduce the concentration of calcium chloride in the bed material. It has been calculated that for a mixture of toluene-20 wt. % carbon tetrachloride, the bed material at equilibrium would contain only about 4% calcium chloride. Such a low concentration of calcium chloride is not likely to result in bed caking.

TABLE II

Calculated Performance of Unvented Processor

| System Parameters | Experimental Reactor | | Large Scale Reactor |
|---|---|---|---|
| | No Bed Cooling | Maximum Rate | Maximum Rate |
| Reactor internal diameter, cm | 15.2 | 15.2 | 500 |
| Control temperature, °C. | 700 | 700 | 700 |
| Feed Composition, wt % | | | |
| Toluene | 80 | 80 | 80 |
| Carbon tetrachloride | 20 | 20 | 20 |
| Feed rate, kg/h | 0.991 | 5.84 | 6,320 |
| Oxygen reaction requirement, g-moles/min | 1.31 | 7.73 | 8,360 |
| Bed Material Parameters | | | |
| Expanded bed height, cm | 91 | 91 | 370 |
| Volume of boiler tubing within bed, liters | 0 | 2.61 | 3,180 |
| Ca density of particles, g-moles/cc | 0.024 | 0.024 | 0.024 |
| Percent CaO reacted | 70 | 70 | 70 |
| Feed rate, kg/h | 5.14 | 30.2 | 32,700 |
| Discharge Rate, kg/h | 7.98 | 47.0 | 50,900 |
| Bed Retention time, min | 104 | 14.9 | 68.5 |
| Inlet Gas Conditions | | | |
| Temperature, °C. | 40 | 40 | 40 |
| Pressure (absolute), bars | 0.988 | 0.988 | 0.988 |
| Oxygen concentration, vol % | 20.2 | 70.0 | 70.0 |
| Linear flow rate at reactor temp., ft/sec | 3.29 | 2.25 | 3.08 |
| Fraction of carbon dioxide reacted, % | 90 | 90 | 90 |
| Outlet Gas Conditions | | | |
| Temperature, °C. | 700 | 700 | 700 |
| Pressure (absolute), bars | 0.846 | 0.846 | 0.612 |
| Oxygen concentration, vol % | 10 | 10 | 10 |
| Linear flow rate at reactor temp., ft/sec | 3.29 | 2.25 | 3.08 |
| Reactor Heat Balance, (25° C. basis), kW | | | |
| Heat entering with fluidized gas | 0.091 | 0.094 | 102 |
| Heat from burning toluene mixture | 8.93 | 52.5 | 56,800 |
| Heat from lime reactions | | | |
| Reaction of $CO_2$ from toluene | 3.0 | 17.7 | 19,200 |
| Reaction of $CCl_4$ | 0.3 | 1.73 | 1,870 |
| Heat leaving fluidizing gas | 4.05 | 3.1 | 3,370 |
| Heat leaving with bed material | 1.56 | 9.18 | 9,950 |
| Heat losses through reactor wall | 6.67 | 6.67 | 78.3 |

TABLE II-continued

Calculated Performance of Unvented Processor

| System Parameters | Experimental Reactor | | Large Scale Reactor |
| --- | --- | --- | --- |
| | No Bed Cooling | Maximum Rate | Maximum Rate |
| Heat removed by cooling coil, kW | 0 | 53 | 64,600 |

Industrial and governmental installations produce many types of hazardous wastes requiring oxidation of organic material during treatment. Some liquid and solid wastes have very high heating values, while others require the addition of an auxiliary fuel to support combustion. Mixed wastes are particularly difficult to treat by standard incineration processes because the emissions may contain radioactive volatile matter or fine particles that escape filtration of the gaseous effluent. These problems are greatly alleviated by the inventive system and process, even for the version of the system and process where the spent lime is regenerated, because of the isolation of the lime during calcining from both the gases formed on destruction of the organic material and the ash which contains radioactive solids.

The need for pure oxygen as the oxidant for the inventive process is a cost factor that affects the types of wastes that can be economically treated. The combined effects of the cost of oxygen and the avoidance of emissions result in the following types of wastes being favored for treatment.

Industrial, military, and DOE wastes containing chlorinated hydrocarbons. Such wastes have low oxygen requirements for destruction.

Solid and liquid mixed wastes. The are particularly hazardous to destroy by standard incineration.

Hospital wastes. These are generated near residential property, are not easily trucked away, and have only a moderate oxygen requirement.

It is anticipated that equipment and installation costs for a system to practice the inventive process will be comparable to the cost of other advanced technology processes for treatment and disposal of hazardous or mixed wastes. The oxidizer 51 and sorber 71 can be combined into one unit, a fluidized bed containing lime, for destruction of liquid combustible wastes. For most other wastes, including all solids and sludges and liquids having high chlorine, bromine, or sulfur content, the oxidizer and sorber would be constructed as two separate units.

The oxidizer 51 and sorber 71, or the combined unit 11 with these functions, will be constructed primarily of carbon steel and lined with refractory materials, as is typically done in the construction of commercially available boilers and furnaces. Fluidized-bed combustors are currently used for converting waste to energy while fully complying with applicable regulations. Suppliers of these combustors typically develop system designs and specifications for the fabrication of components and procurement of auxiliary equipment.

To construct a system for practicing the inventive process, the carbon dioxide sorber, water condenser, and recirculation equipment would be installed instead of the extensive exhaust treatment system of a conventional incinerator. For the system in which the lime is regenerated and recycled on site, the off-gas from the calcining unit would have only 10% of the volume of the off-gas from a conventional incinerator and would require only cooling and filtration to remove solids. On-line monitoring, sampling, and analytical costs are likely to be lower for the inventive process than for an incinerator.

The oxygen requirements for the combustor is known to be a major cost item. A preliminary analysis indicates that the cost of the oxygen will be $50 to $300 per ton of waste, depending on the oxygen requirement of the particular waste treated. The oxygen cost will be offset to some extent by the higher throughput available for an oxidizer if supplied with gas at high oxygen concentration.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for treating organic waste materials without venting gaseous emissions to the atmosphere, comprising establishing and maintaining a fluidized bed including lime particles operated at a temperature not less than about 500° C. by blowing gas having an oxygen content in the range of from about 20% to about 70% upwardly through the bed particles at a rate sufficient to fluidize the bed particles, introducing an organic waste material into the fluidized bed, the fluidized bed operating at a temperature sufficient thermally to degrade the organic waste material forming reaction products some of the reaction products reacting with lime in the bed forming $CaCO_3$, filtering particulates carried with the off gases from the fluidized bed, cooling the filtered off gases from the fluidized bed to condense water present in the off gases and removing the condensed water, removing a portion of the calcium carbonate formed during operation of the fluidized bed and replacing same with lime particles, and continuously recirculating the off gases from the fluidized bed after water is removed therefrom and oxygen added thereto until the organic waste material in the bed is destroyed.

2. The process of claim 1, wherein the fluidized bed temperature is maintained in the range of from about 500° C. to about 750° C.

3. The process of claim 1, wherein the off gases are cooled to a temperature of less than about 80° C. to remove water therefrom.

4. The process of claim 1, wherein the fluidizing gas is a mixture of dried off gas from the fluid bed and at least 99.5% pure oxygen.

5. The process of claim 1, and further including a source of heat to the fluidized bed to maintain combustion therein.

6. The process of claim 1, wherein particulates in the fluidized bed off gases are filtered with ceramic candle filters.

7. The process of claim 1, and further comprising passing the condensed water through an activated carbon filter to remove any radioactive or metallic elements in the water.

8. The process of claim 1, wherein the waste material is introduced continuously or intermittently to the fluidized bed.

9. The process of claim 1, wherein the waste feed is interrupted and removal of bed material is interrupted to permit recirculation of the off gases until the waste material is fully destroyed thereby increasing the residence time of the waste material in the bed.

10. A process for treating organic waste material without venting gaseous emissions to the atmosphere, comprising establishing and maintaining an oxidizer having lime particles therein at a temperature not less than about 600° C., introducing an organic waste material and an oxygen-containing gas into the oxidizer where the organic waste material degrades thermally and/or reacts with oxygen and lime particles present to form reaction products and off gases which exit the oxidizer, filtering particulates carried with the off gases from the oxidizer, establishing and maintaining a fluidized bed including lime particles operated at a temperature of not less than about 500° C. by blowing off gases from the oxidizer upwardly through the bed particles at a rate sufficient to fluidize the bed particles and chemically to react any $CO_2$, $SO_2$ and acid gases present in the off gases from the oxidizer forming $CaCO_3$, filtering particulates carried with the off gases from the fluidized bed, cooling the filtered off gases from the fluidized bed to condense water present in the off gases and removing the condensed water, transmitting a portion of the $CaCO_3$ formed during operation of the fluidized bed to a calciner operated at a temperature of at least about 950° C. to convert the $CaCO_3$ to $CaO$ producing $CO_2$, continuously recirculating the off gases from the oxidizer and fluidized bed until the waste material is destroyed.

11. The process of claim 10, wherein the oxidizer is maintained at a temperature in the range of from about 600° C. to about 900° C. and the fluidized bed is maintained at a temperature in the range of from about 500° C. to about 700° C.

12. The process of claim 11, wherein the oxidizer is a rotary kiln.

13. The process of claim 11, wherein the oxidizer is a slagging combustor.

14. The process of claim 11, wherein the oxidizer is a multiple hearth furnace.

15. The process of claim 10, wherein a portion of the fluidized bed is continuously fed to the oxidizer and to the calciner and further including the step of removing inert gases from the dried off gases from the fluidized bed and intermittently using the collected inert gases to back flush the filters in either or both of the oxidizer and fluidized bed filters.

16. The process of claim 11, wherein the off gases are cooled to a temperature of less than about 80° C. to remove water therefrom and the fluidizing gas is a mixture of dried off gas from the fluid bed and at least 99.5% pure oxygen, and further providing heat to the fluidized bed to maintain combustion therein, and wherein particulates in the fluidized bed off gases are filtered with ceramic candle filters.

17. A system for treating organic waste material without venting gaseous emissions to the atmosphere, comprising a fluidized bed reactor for housing a fluidized bed including lime particles operated at a temperature not less than about 500° C. by blowing a gas having an oxygen content in the range of from about 20% to about 70% upwardly through the bed particles at a rate sufficient to fluidize the bed particles, means for introducing an organic waste material into the fluidized bed, the fluidized bed operating at a temperature sufficient to degrade thermally the organic waste material forming reaction products some of the reaction products reacting with lime in the bed forming $CaCO_3$, a filter in fluid communication with the free board space in said fluidized bed reactor for filtering particulates carried with the off gases from the fluidized bed, means for cooling the filtered off gases from the fluidized bed to condense water present in the off gases and for removing the condensed water from the dried off gases, means for removing a portion of the calcium carbonate formed during operation of the fluidized bed and for replacing the removed $CaCO_3$ with lime particles, and means for continuously recirculating the dried off gases from the fluidized bed until the organic waste material in the bed is destroyed.

18. The system of claim 17, wherein the fluidized bed is maintained at a temperature in the range of from about 500° C. to about 750° C., the filter is a ceramic candle filter, the off gas cooling means is a condenser operated at a temperature in the range of from about 40° C. to about 80° C., and further including means for introducing oxygen of at least 99.5% purity to the fluidized bed to maintain the oxygen content of the fluidizing gas.

19. A system for treating organic waste material without venting gaseous emissions to the atmosphere, comprising an oxidizer having lime particles therein operated at a temperature not less than about 600° C., means for introducing an organic waste material and an oxygen-containing gas into said oxidizer where the organic waste material degrades thermally and/or reacts with oxygen and lime present to form off gases which exit said oxidizer, a filter in fluid communication with said oxidizer for filtering particulates carried with the off gases from said oxidizer, a fluidized bed reactor for housing a fluidized bed including lime particles operated at a temperature of not less than about 500° C. by blowing off gases from said oxidizer upwardly through the bed particles at a rate sufficient to fluidize the bed particles and chemically to react any $CO_2$, $SO_2$ and acid gases present in the off gas forming $CaCO_3$, a filter in fluid communication with the free board space above the fluidized bed for filtering particulate carried with the off gases from the fluidized bed, means for cooling the filtered off gases from the fluidized bed to condense water present in the off gases and removing water from the dried off gases, means for transmitting a portion of the $CaCO_3$ formed during operation of the fluidized bed to a calciner operated at a temperature of at least about 950° C. to convert $CaCO_3$ to $CaO$ particles and $CO_2$, means for collecting the $CO_2$ and recirculating $CaO$ particles to said oxidizer and to the fluidized bed, and means for continuously recirculating the off gases from said oxidizer and fluidized bed until the waste material is destroyed.

20. The system of claim 19, wherein the oxidizer is maintained at a temperature in the range of from about 600° C. to about 900° C. and the fluidized bed is maintained at a temperature in the range of from about 500° C. to about 700° C., a portion of the fluidized bed is continuously fed to the oxidizer and to the calciner and further including means of removing inert gases from the dried off gases from the fluidized bed and means for intermittently back flushing either or both of the oxidizer and fluidized bed filters with the collected inert gases wherein said condenser is operated at a temperature of less than about 80° C. to remove water from the off gases, the fluidizing gas is a mixture of dried off gas from the fluid bed and at least 99.5% pure oxygen, and further comprising a heat source in communication with the fluidized bed to maintain combustion therein, and wherein said filters are ceramic candle filters.

* * * * *